United States Patent [19]
Flanagan et al.

[11] Patent Number: 5,966,685
[45] Date of Patent: *Oct. 12, 1999

[54] SYSTEM FOR PARALLEL FOREIGN LANGUAGE COMMUNICATION OVER A COMPUTER NETWORK

[75] Inventors: Mary A. Flanagan, Framingham, Mass.; Alexander B. Trevor, Worthington, Ohio; Philip Jensen, Roslindale, Mass.

[73] Assignee: America Online, Inc., Dulles, Va.

[*] Notice: This patent is subject to a terminal disclaimer.

[21] Appl. No.: 08/745,222

[22] Filed: Nov. 8, 1996

Related U.S. Application Data

[63] Continuation of application No. 08/388,630, Feb. 14, 1995, abandoned.

[51] Int. Cl.[6] .................................................. G06F 17/28
[52] U.S. Cl. ............................... 704/8; 704/2; 707/536; 379/88.05; 379/88.06
[58] Field of Search ................................. 704/1, 2, 3, 4, 704/5, 6, 7, 8; 379/88.05, 88.06, 88.22; 707/536

[56] References Cited

U.S. PATENT DOCUMENTS

| | | | |
|---|---|---|---|
| 4,615,002 | 9/1986 | Innes | 704/8 |
| 5,029,085 | 7/1991 | Ito | 704/9 |
| 5,268,839 | 12/1993 | Kaji | 704/3 |
| 5,295,068 | 3/1994 | Nishino et al. | 704/10 |
| 5,497,319 | 3/1996 | Chong et al. | 364/419.02 |
| 5,541,837 | 7/1996 | Fushimoto | 704/2 |
| 5,675,817 | 10/1997 | Moughanni et al. | 704/3 |
| 5,715,466 | 2/1998 | Flanagan et al. | 704/5 |
| 5,740,231 | 4/1998 | Cohn et al. | 379/88.22 |

OTHER PUBLICATIONS

PC Magazine, V10, N15 p 231 (24), Sep. 10, 1991, Tools for Wide Area Communications, Joe Salemi.
Computer Shopper, Jan. 1993, V13, N1 p 766(2) Treading the Boards; Call Foreign Boards or use Echoail to extend your Further than your Wallet, Dennis Fowler.
The Seybold Report, Oct. 30, 1992, V22, N4, p 14(2) Machine Assisted Translation, George A. Alexander et al.
Seybold Report on Desktop Publishing, Jan. 1, 1991, V5, N5, p 24(3) Multilanguage Software is Everywhere.
PC Magazine, V10, p 23(24), Sep. 10, 1991, Tools for Wide Area Communications, Joe Salemi.
Computer Shopper, Jan. 1993, V13, N1, p 766(2), Treading the Boards: Call Foreign Boards or use Echomail to Extend Your Reach Further Than Your Wallet, Dennis Fowler.
The Seybold Report, Oct. 1992, V22, N4, p 14(2), Machine Assisted Translation, George A. Alexander, et al.
Sybold Report on Desktop Publishing, Jan. 1, 1991, V5, N5, p. 24(3), Multilanguage Software is Everywhere.

*Primary Examiner*—Joseph Thomas
*Attorney, Agent, or Firm*—Standley & Gilcrest LLP

[57] ABSTRACT

A system is disclosed which allows for an electronic discussion group user to communicate with another user who speaks a different language. Machine translators and other software are incorporated to translate messages, thereby creating parallel discussion groups in different languages.

12 Claims, 14 Drawing Sheets

| Title | Topics | Msgs |
|---|---|---|
| ☐ General Questions | 202 | 405 |
| ☐ Common Solutions | 4 | 4 |
| ☐ Install/Upgrade | 43 | 108 |
| ☐ Modems/Hardware | 39 | 80 |
| ☐ Forums | 17 | 31 |
| ☐ Mail | 46 | 88 |
| ☐ Filing Cabinet | 15 | 43 |
| ☐ Printing | 2 | 3 |
| ☐ Online Services | 14 | 28 |
| ☐ Terminal Emulation | 3 | 4 |
| ☒ MT Comments | 2 | 2 |
| ☐ Suggestions | 6 | 11 |

Since 11/16/94 12:04 AM

[Select] [Mark] [All] [Close]

Fig. 7

SYSTEM FOR PARALLEL FOREIGN LANGUAGE COMMUNICATION OVER A COMPUTER NETWORK

This application is a file wrapper continuation of application Ser. No. 08/388,630 filed Feb. 14, 1995 abandoned.

BACKGROUND AND SUMMARY OF THE INVENTION

The present invention relates generally to the technical field of electronic communication over a computer network and, more particularly, the present invention relates to multi-lingual electronic communication in the form of parallel electronic discussion groups.

In the field of the present invention there are basically two types of electronic network communication in use today: electronic mail and bulletin board systems. Electronic mail is a way of sending messages to another computer user (possibly located at a remote site) through the use of a modem. Electronic mail is generally used to send messages to other computer users about any subject. A bulletin board system (BBS) may be run from a computer that uses a special program to allow other computers to call it, by use of a modem, ordinarily over standard telephone lines. A BBS acts as a storage facility, where people calling from their computers can post or receive messages and send or receive program files. A BBS is usually subdivided by topics so that users with similar interests can send information to other users of similar interests. These related groups of messages are referred to as topics, message areas, Forum® (a registered trademark of CompuServe Incorporated) or conferences (i.e. a particular BBS may contain numerous related groups of messages such as on the subjects of travel, sports, stamp collecting, etc. . . . ).

BBSs are distinguishable from electronic mail in that BBSs are used for posting messages of a particular group of computer users who have similar interests but these posted messages are not ordinarily addressed to any particular user. BBSs are also used by some computer users who wish to just read posted messages and other information, without having to post a reply message. For example, a person in Columbus, Ohio, who is preparing for a vacation, may access a BBS on travel, through his home computer, and post a message asking for the best places to go skiing in the United States. Other network users with an interest in travel may read the message from the person from Columbus, and then reply with their opinion about where the best place is for skiing. There are thousands of BBSs available to computer network users on a wide variety of subject areas.

As the number of computer networks being accessed by international users increases, the number of online discussion groups for users with similar interests, from different countries, also increases. For example, a person in France may access a discussion group on international law, to obtain information about trade laws. Assuming that the French person is only familiar with the French language, the French person cannot send a message that would be understood by a German speaking user or an English speaking user. Thus, the need arises for an electronic discussion group which can be utilized by foreign language speaking users.

Language translation software is currently available, however, to Applicants' knowledge, it has only been used for purposes of electronic mail, in online services environments, where the identity and language of the person receiving the message is known. For example, if a French person wants to send a message to Bob Smith, who is American, the French person can send the message through a French to English machine translator on the network. However, there is currently no successful implementation of language translation software in an environment such as an electronic public discussion group which may have an unknown group of users of different languages. For example, if a French speaking person wants to access a travel discussion group, run from a BBS in New York, and inquire into the best places for mountain climbing in the world; currently, the French person can translate his message to the discussion group in only one other language (e.g. English). Thus, only people who can read English or French would understand and be able to reply to the message. A person in Japan, who does not have command of the English language and has valuable information relating to mountain climbing in Japan, will not understand the message posted in English and will not be able to respond to the inquiry. Additionally, if the French person cannot read English, he will not understand replies posted to the discussion group in English.

The present invention is a system of parallel discussion groups operated in conjunction with a message collection/posting software program, data filter software program, and a machine translation software program. The present invention comprises a number of discussion groups running in "parallel"; one group for each language being used in the discussion groups. The individual discussion groups all contain the same information, in the same order; the only difference being that each parallel discussion group is written in a different language.

In the present invention, once a user logs onto a particular parallel discussion group he or she may then choose his or her language preference. If the user's language preference is set to French, the French version of the discussion group will be accessed. Messages posted to a discussion group will be periodically collected, translated to the other languages, and then posted to those respective target language discussion groups. The collection and posting of the messages will be accomplished by the Message Collection/Posting Software which forms a part of the present invention. The new messages which are collected on a periodic basis are sent to a commercially available Machine Translation (MT) software for translation. Messages are batch processed automatically at the network site and without human intervention. The translation takes place at a remote site so user actions are minimized. Users simply specify a language preference that is communicated to the network in order to take advantage of the present invention.

Before the input text is actually submitted to the MT software, the input text is passed through a filter software program which preprocesses the data before it is submitted to the MT software. The filter identifies and marks strings which are best left untranslated by the MT software, such as personal names, company product names, file and path names, commands, samples of source code, and the like. By marking these strings, the filter notifies the MT software to leave those strings untranslated. These strings are then linked to a preceding "hookword". Hookwords are automatically inserted then deleted in post-processing and are contained in dictionaries with a part-of-speech and other grammatical features to effect rearrangement of the word in the target language. Once the translation process is complete, the translations are collected and posted, by the Message Collection/Posting Software, to the target language discussion groups at the same location within the message structure as the original version of the message. The preprocessing, translation, and post-processing functions are all performed automatically in accordance with a batch process that executes on a periodic basis at the network site.

Thus, some of the messages on a French version of a discussion group will have been originally written in French whereas many will be translations of messages which were originally written in a different language. Each of the messages translated from another language version of the parallel discussion group may contain both the translated message and the original language text. For example, a message originally written in the English version of the discussion group and translated to the French version may be shown on screen with the original English text in addition to the French translation.

The primary object of the invention is to create a structure and process to enable discussion group users, of different languages, to communicate with one another. In a preferred embodiment of the present invention, this object is accomplished through an automatic batch process that executes at a remote site. No human intervention is required for the pre-processing, translation, or post-processing functions. Additionally, users simply specify a language preference to realize the benefits and advantages of the present invention. Further objects and advantages of this invention will become apparent when viewed in light of the following drawings and detailed description.

BRIEF DESCRIPTION OF THE DRAWINGS

FIG. 7 is an example of a screen display of a user accessing a parallel discussion group via point and click;

DETAILED DESCRIPTION OF PREFERRED EMBODIMENT(S)

Figure 1:
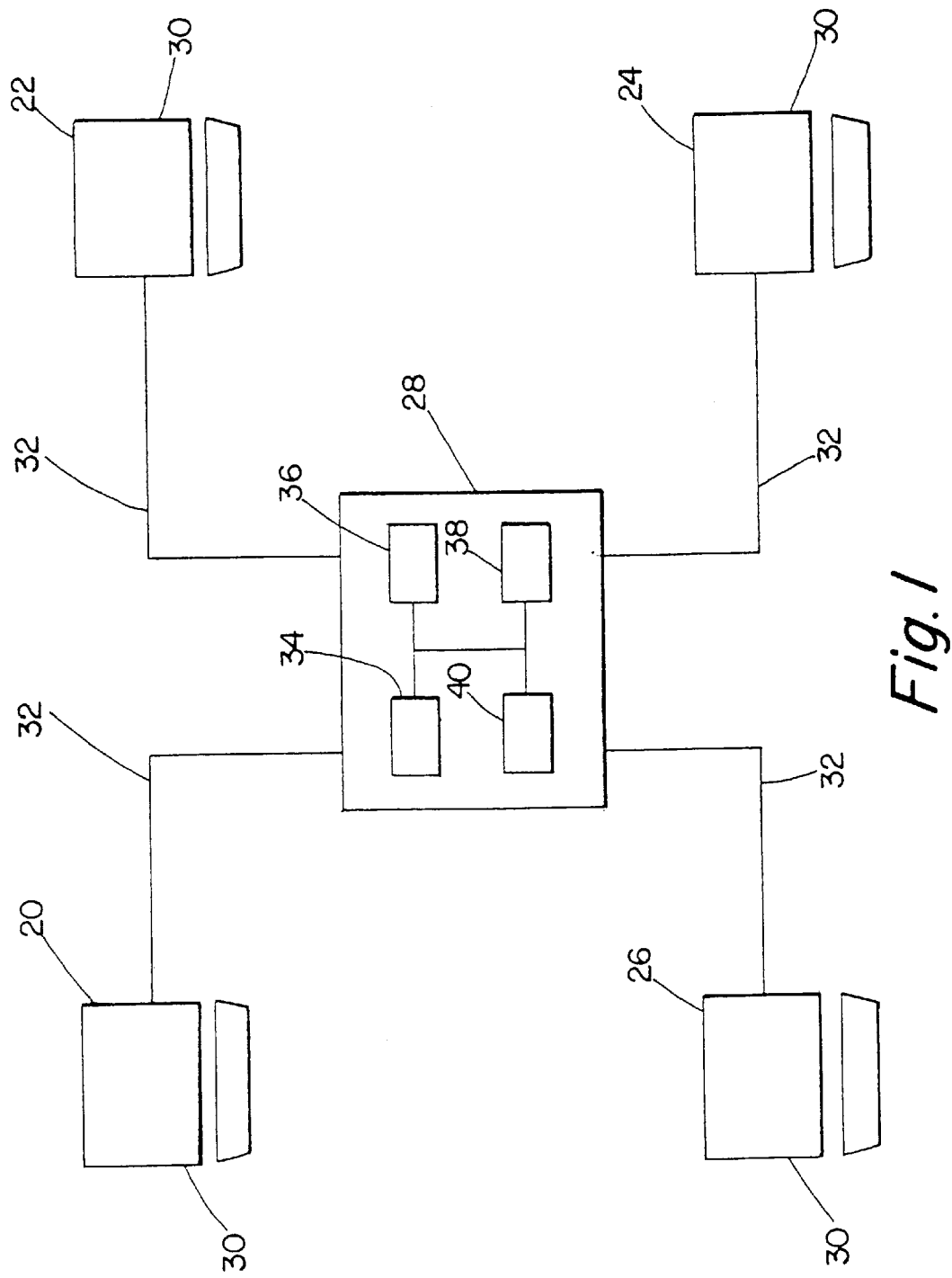
FIG. 1 illustrates a Bulletin Board System that is accessed by users that speak different languages.

Referring now to FIG. 1, a bulletin board system is shown. Users 20, 22, 24, 26 can access the bulletin board system 28 through a personal computer 30 and a modem. The users' personal computers are ordinarily connected to the bulletin board by telephone lines 32. The bulletin board system is subdivided by subject discussion areas, for example sports, travel, skiing, stamp collecting 34, 36, 38, 40 respectively. These discussion areas may be further broken down into several sections based on subject. For example, a sports discussion area may be separated into football, basketball, and baseball sections. Once a user obtains access to a particular bulletin board system, he or she may then log on to any of the discussion areas contained in the particular bulletin board system.

Figure 2:
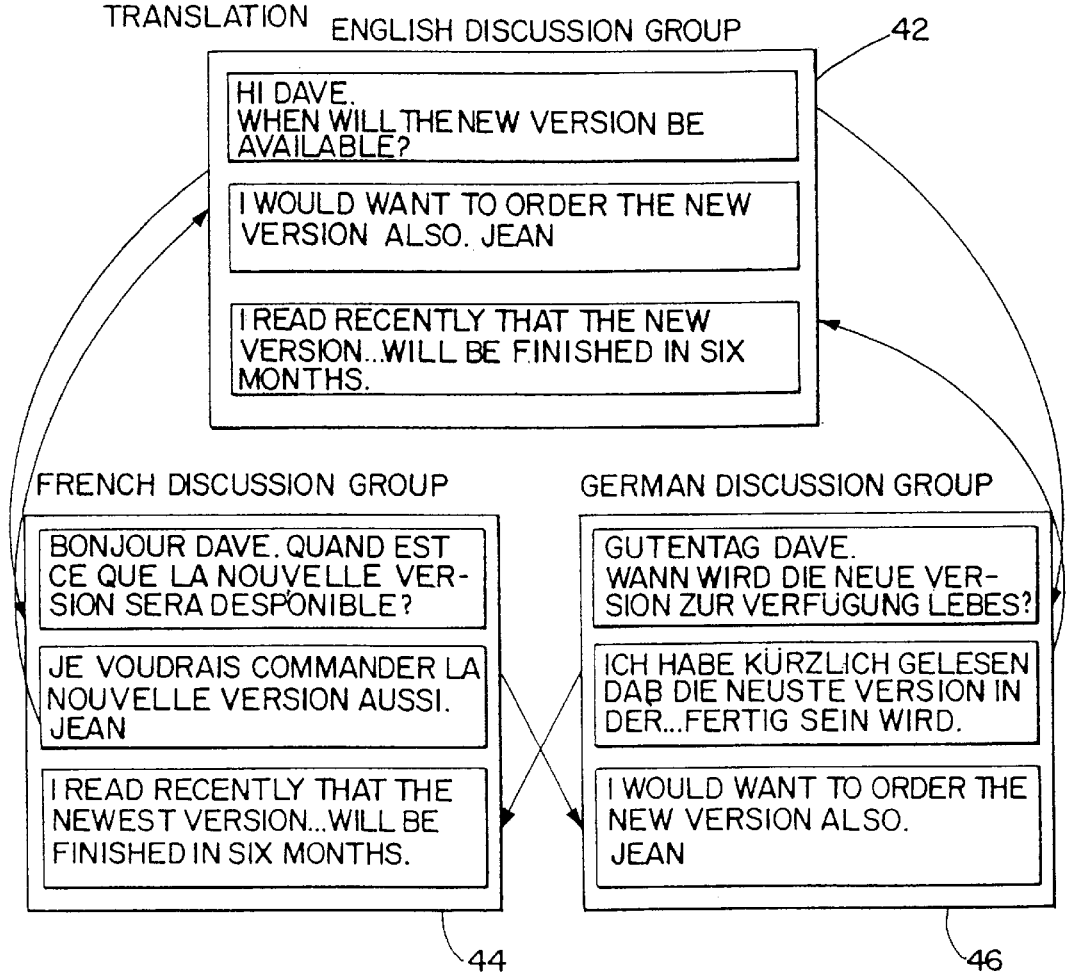
FIG. 2 is a diagrammatic view of one embodiment of the present invention, in which multiple languages are in communication over parallel discussion groups.

FIG. 2 illustrates the basic structure of parallel discussion groups, according to the present invention. FIG. 2 illustrates a communication system which is comprised of three parallel discussion groups in English, French, and German, respectively shown at 42, 44, 46. The number of parallel discussion groups for a particular system varies with the number of languages it is designed to accommodate. For example, a parallel system designed to accommodate ten different languages will have ten parallel discussion groups; one for each language.

FIG. 2 illustrates the message structuring of one embodiment of the present invention. Upon logging onto a discussion group, the user may choose his or her language preference. All translation is performed at the network site so no other actions on the part of the user are required to take advantage of the present invention. For example, a French user may log onto a discussion group and access the French version of the system. For example, FIG. 2 depicts the message structuring of a French version of a parallel discussion group. The message board section names and messages will be in French. Each of the messages translated from other language versions may also contain the text in the original language in addition to the French translation. If the French user posts a message to the parallel discussion group as shown in FIG. 2, it will be translated to English and German and posted to the English and German versions of the system.

The content, structure, and "thread" structure of the parallel discussion groups are preferably identical. When a message is posted and another user responds to it, a "thread" is created. A thread is a string of two or more related messages that are grouped together and preserve the original subject heading. For example, a French reply to an original English message is assigned properly to the English message. In a typical BBS, a user can display a hierarchical view of a thread to examine the history of the thread and the relationships between messages posted to that discussion group.

Figure 3:
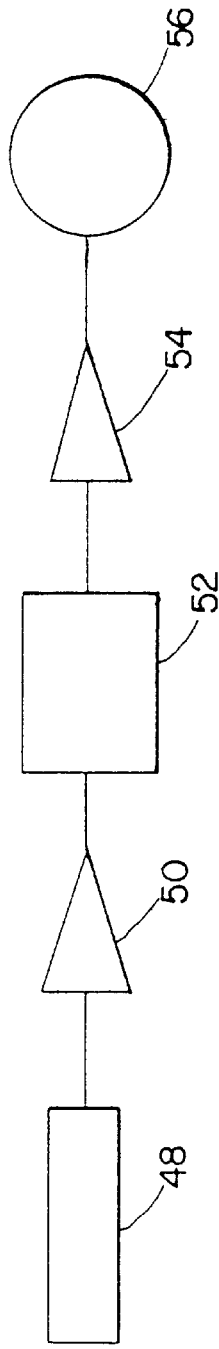
FIG. 3 illustrates the overall message translation process of the present invention.

FIG. 3 depicts the overall process steps involved in translating and posting a message from its original version to the other language discussion groups. Every message posted to a discussion group is preferably assigned a message identification number by the discussion group software. In the preferred embodiment of this invention, the Message Collection/Posting Software 48 identifies new messages posted to a discussion group by comparing the message identification numbers to a continuously created database of old message identification numbers. New messages are collected on a periodic basis and submitted to the filter software 50 for preprocessing of the message text before submitting it to the MT Software 52. A batch process executes automatically so that no human intervention is required for pre-processing, translation, or post-processing.

The filter identifies and marks strings in the message text which are best left untranslated; such as, personal names, company and product names, quoted text, file and path names, commands, and samples of source code. These strings are then linked to a preceding hookword. Hookwords are automatically inserted then deleted in post-processing 54. Hookwords are contained in the Intergraph dictionaries with part-of-speech and grammatical features which affect rearrangement of the nontranslated word in the target language. Once translated, the message is delivered to the target discussion group 56 in the language of that discussion group.

In the preferred embodiment, direct translation of the message text is performed (e.g. direct French to English translation). The MT Software analyzes and tags the sentences of the message text using linguistic algorithms. The words in the sentences are then looked up in electronic dictionaries to identify their translations. The translated words are then reordered and inflected according to the rules of the target language. Machine translation software has been developed by the Intergraph Corporation and is commercially available. Customized dictionaries containing computer specific terminology were developed by CompuServe Incorporated.

Once the translation process is complete, the translations are collected and posted to the target language discussion group at the same location within the message structure. This is accomplished by the Message Collection/Posting Software.

The following example will serve to provide a more detailed description of the present invention. It must be stressed that the following is only an example implementation of the invention and is not intended to limit the scope of the invention to the specific features described in the example.

EXAMPLE

Figure 4:
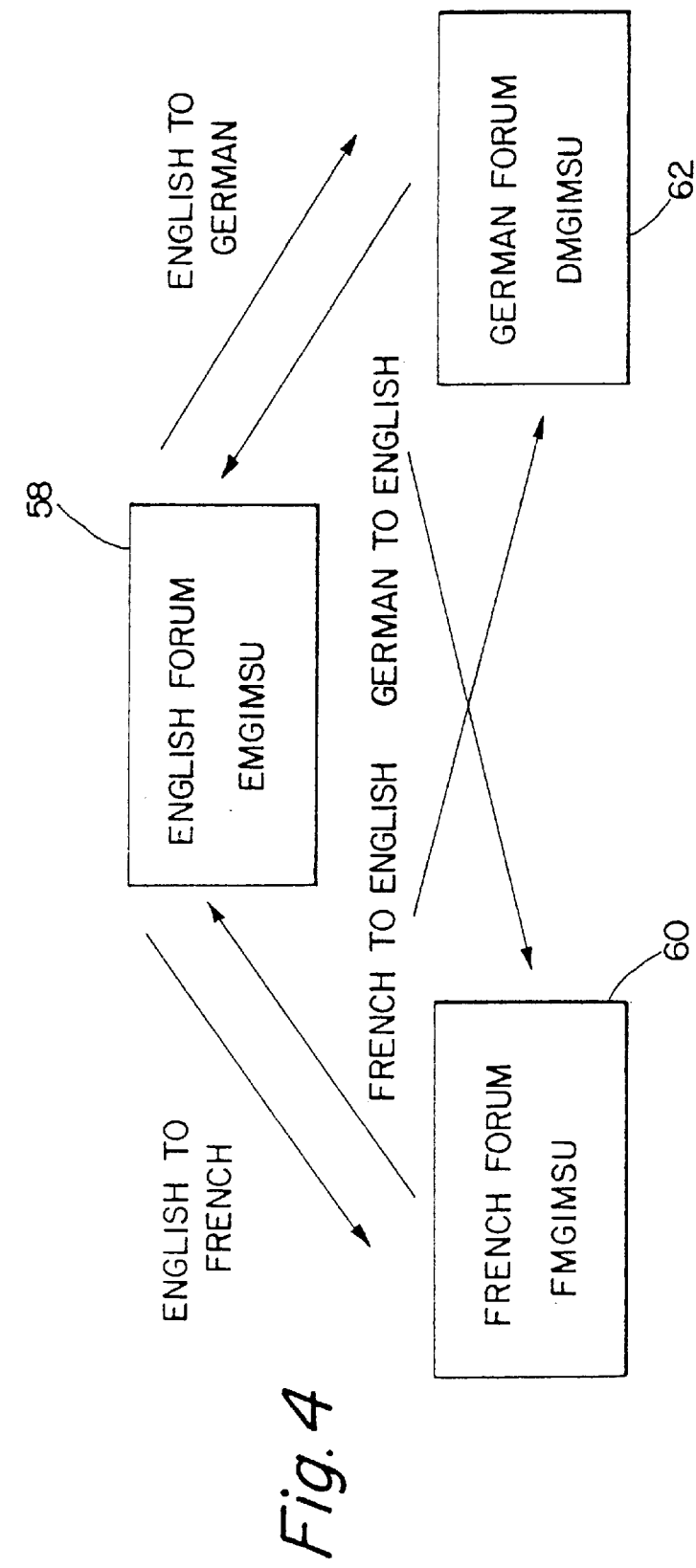
FIG. 4 is a diagrammatic view of an example of one embodiment of the present invention.

The MacCIM Forum® discussion group is one of the most popular and widely-used groups on the CompuServe Network, especially in Europe. New and experienced CompuServe Information Service ("CIS") users access MacCIM to learn how to use the service, to enhance their access to the CIS Network, and to offer suggestions for improving MacCIM. French and German users frequently log on to this discussion group, but until recently only minimal support was available to them in their native languages. Refer to FIG. 4 for a high-level overview of this embodiment of the invention, known as the MT Model.

The MT Model has three views that are each separate CompuServe discussion groups —one in English (EMCIMSU) 58, one in French (FMCIMSU) 60, and one in German (DMCIMSU) 62. A user may only see one view at a time. All three discussion groups contain the same message content and configuration. In this Example, the following translation directions occur: English to French; English to German; French to English; and German to English.

In all three discussion groups, the message board section names appear in the native language. Messages in each section appear in the native language or are translated from another language. All of the discussion (groups in this embodiment have an MT Comments section that is designated for any issues relating to machine translation. When a user posts a message on any one of the three discussion groups, the message translation process performs the translations and posts the translated messages onto the other two discussion groups. Messages translated from another language preferably contain the translation as well as the message as it originally appeared.

There are at least two ways a user can access the discussion groups. The first is to type GO MACCIM from the CompuServe menu. The discussion group appears in the language that is defined in the user's language preference setting. A user whose language preference is set to English views EMCIMSU. A user whose language preference is set to French views FMCIMSU. A user whose language preference is set to German views DMCIMSU.

The second way to access any of these discussion groups is by typing GO plus any one of the three translation discussion group names. For example, if a French user types GO EMCIMSU, the English translation discussion group would display even though the user's language preference is set to French. This French user would still be able to view and post messages in this discussion group.

Figure 5:
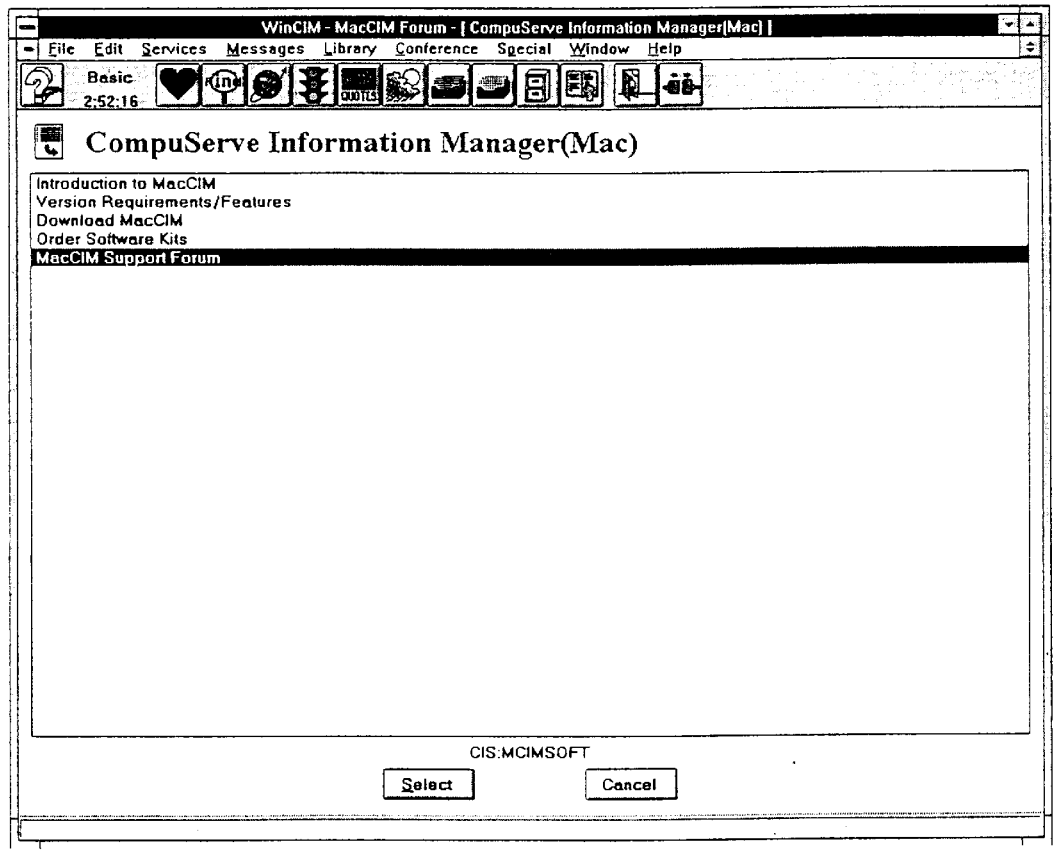
FIG. 5 is an example of a user's computer screen display while accessing the present invention through CompuServe.
Figure 6:
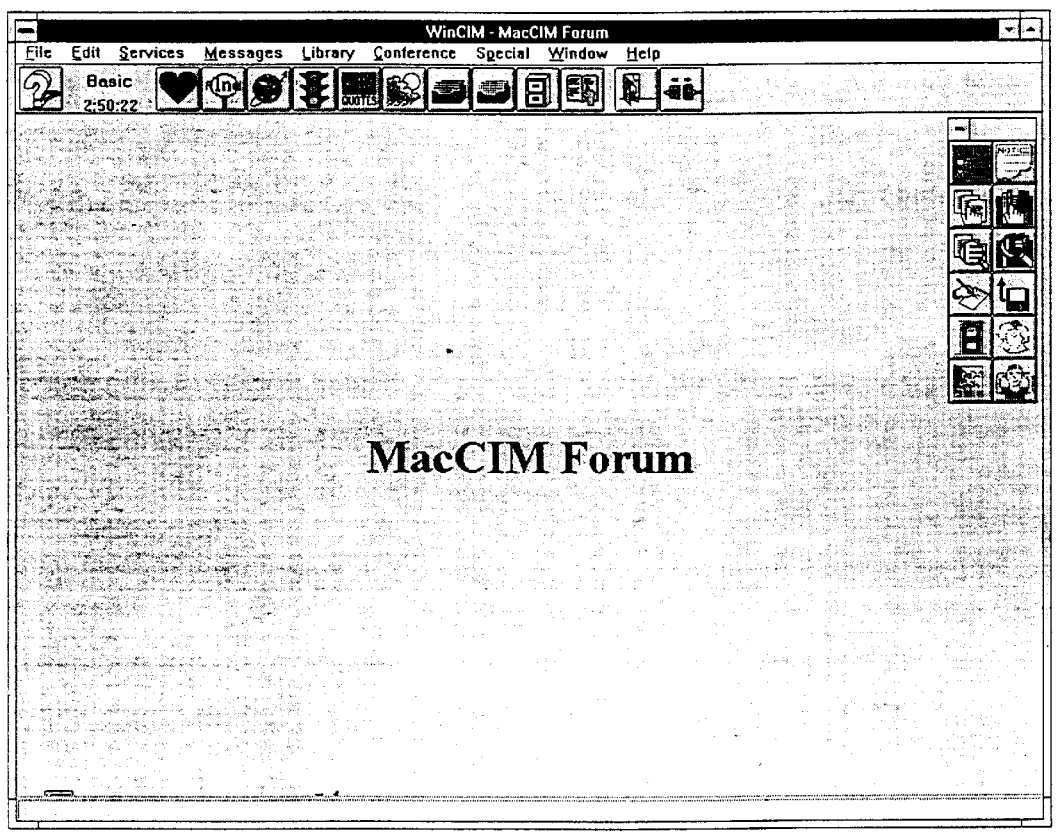
FIG. 6 is an example of a screen display of a user entering a particular discussion group.

An English-speaking user logs on to MacCIM to view new messages. Because she typed GO MACCIM and because her language preference in her CompuServe profile is set to English, the system navigates her to EMCIMSU. She sees a screen similar to that shown in FIG. 5. When the user selects the MacCIM Forum® discussion group, the screen displays as shown in FIG. 6. Next she selects the Messages icon to display the message board. As shown in FIG. 7, the user selects new messages in the MT Comments section, which refers to issues relating to machine translation. She notices she has two messages in this section.

Figure 8:
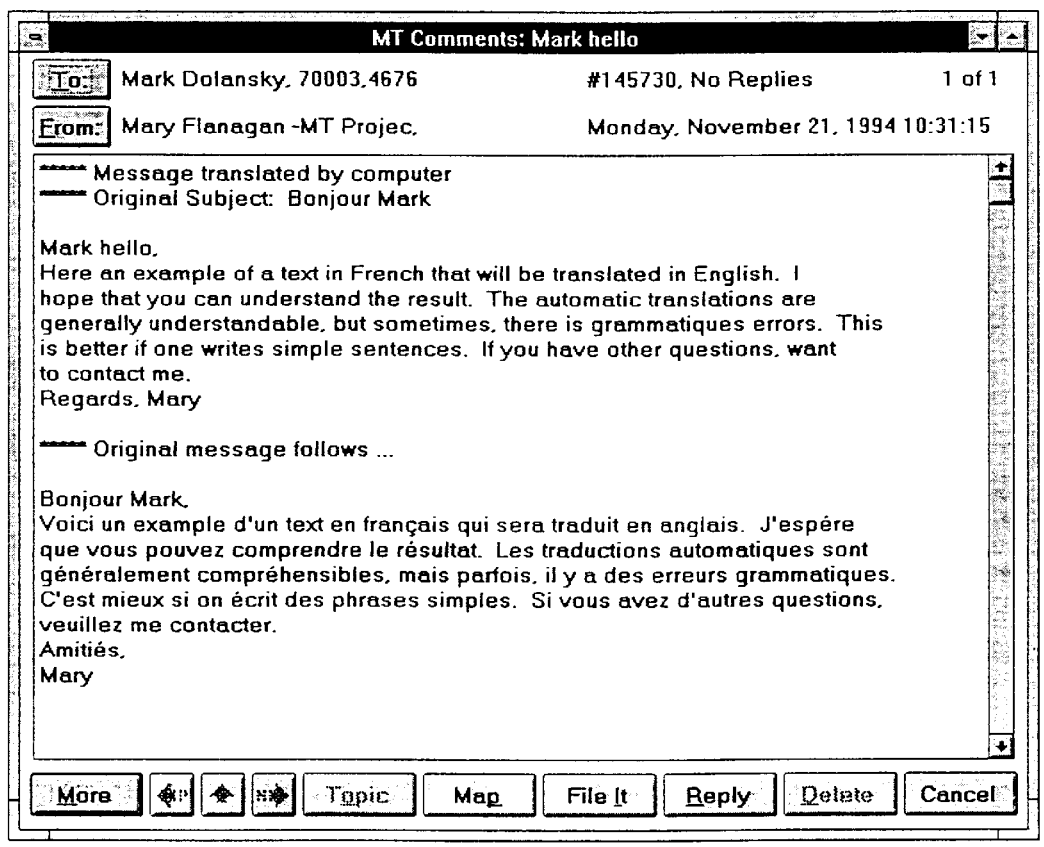
FIG. 8 is an example of a screen display of an original language message and a parallel foreign language translation message.
Figure 9:
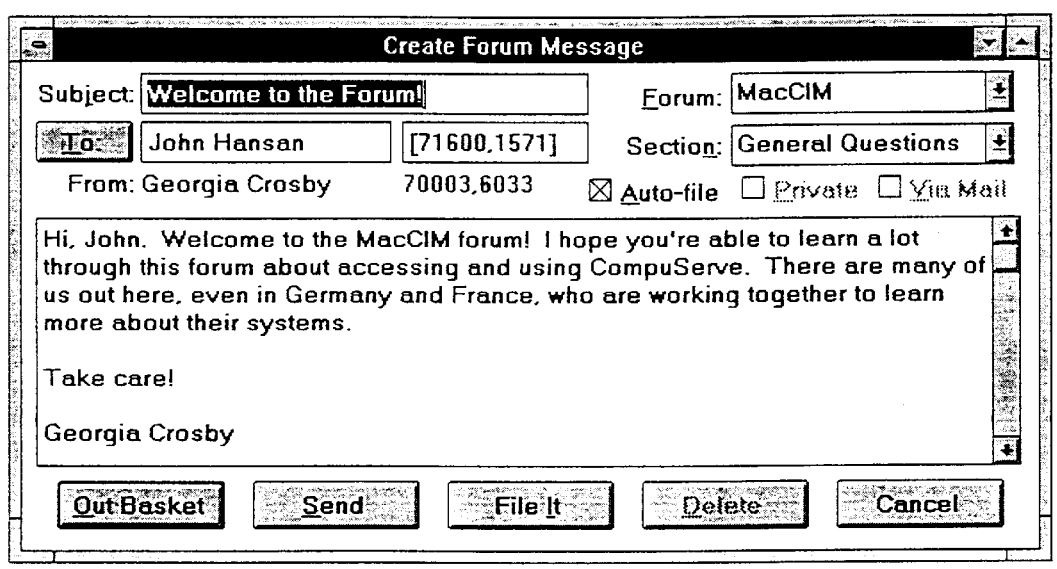
FIG. 9 is an example of a screen display for a user creating an original message to be posted on a parallel foreign language discussion group.
Figure 10:
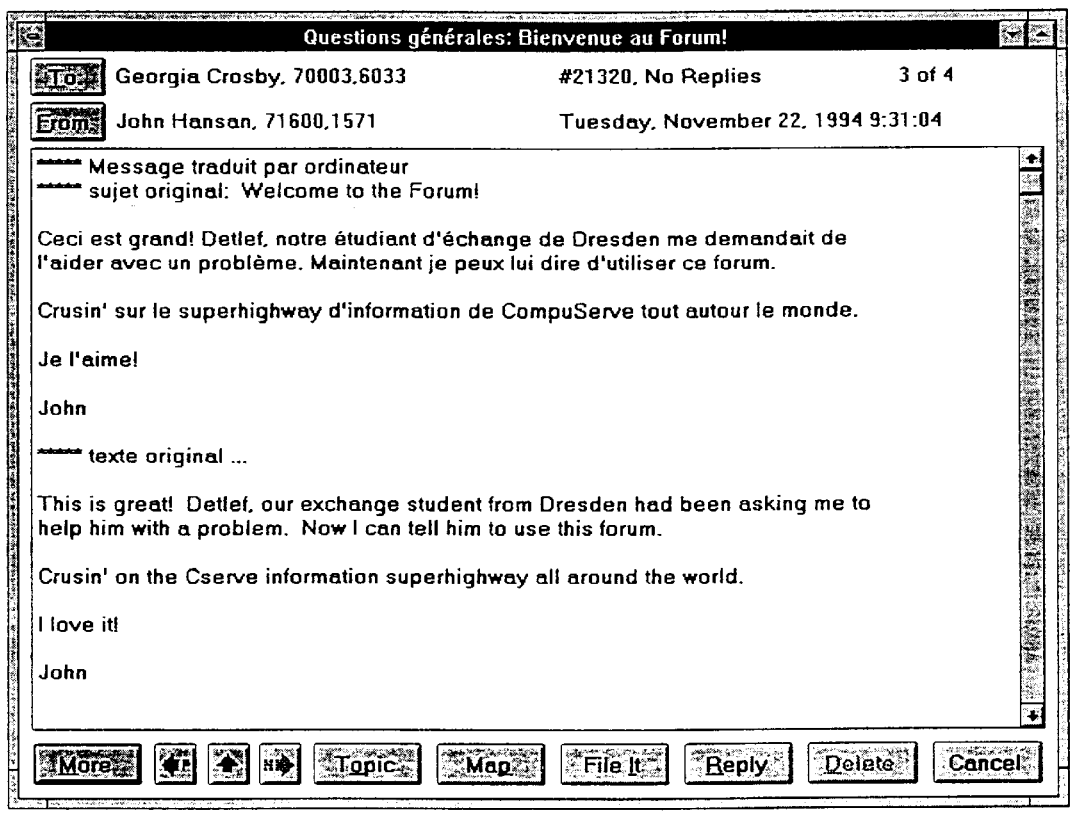
FIG. 10 is an example of a screen display for a user responding to the original message shown in FIG. 9.

The user reads a message translated from French to English as shown in FIG. 8. In this embodiment, the message includes both the translation and the text as it was originally written in French. During a MacCIM session, the English-speaking user decides to post a message to a person who she knows has recently joined the MacCIM Forum®. She posts the message to the General Questions section as shown in FIG. 9. Later she logs off. Because this user is also fluent in French, she decides to bypass the English version of the MacCIM® Forum® and go directly to the French version to view any responses to her message. She finds she has received one response as shown in FIG. 10.

The user may still view any responses to her message by staying on the English version of the discussion group because any French or German responses to her message would still be translated and posted there. The present invention does not require her to go to the French group to view French replies.

Continuing with this Example, certain terms are defined to facilitate an understanding of the invention. Each translated message has two banners: one that introduces the translated message and another that introduces the message as it appeared in its original language. DP/Translator is the Intergraph® Corporation's natural language translation system used to perform the MT Model's language translation in this embodiment of the invention. Filtering refers to the process by which messages are prepared for translation by DP/Translator. A header is the CompuServe message information that appears at the top of any standard message.

In this embodiment of the invention, message translation is a batch process that runs on an hourly basis. It is driven by a Unix Shell script tricycle, which calls all the necessary programs in the order they need to run. A language code is a one-letter code that refers to a language. For example, French is referred to as f. In the following detailed process descriptions, this is abbreviated as lang-code. A language pair is a two-letter code that refers to the two languages from and to which translation occurs. The first letter is the source language; the second is the target language. For example, in an English-to-German translation, the language pair is eg. In the detailed process descriptions, this is abbreviated as lang-pair. Post-filtering refers to the process by which messages are further prepared for the pre-posting process once they have been translated. A shell script is a Unix-based file that contains a list of Unix commands.

A Unix shell script tricycle runs at a predetermined interval (in one preferred embodiment this interval was set at one hour) to retrieve new messages that users post onto the discussion groups. It passes them through the translation process and posts them to all three parallel discussion groups, in this Example.

Figure 11:
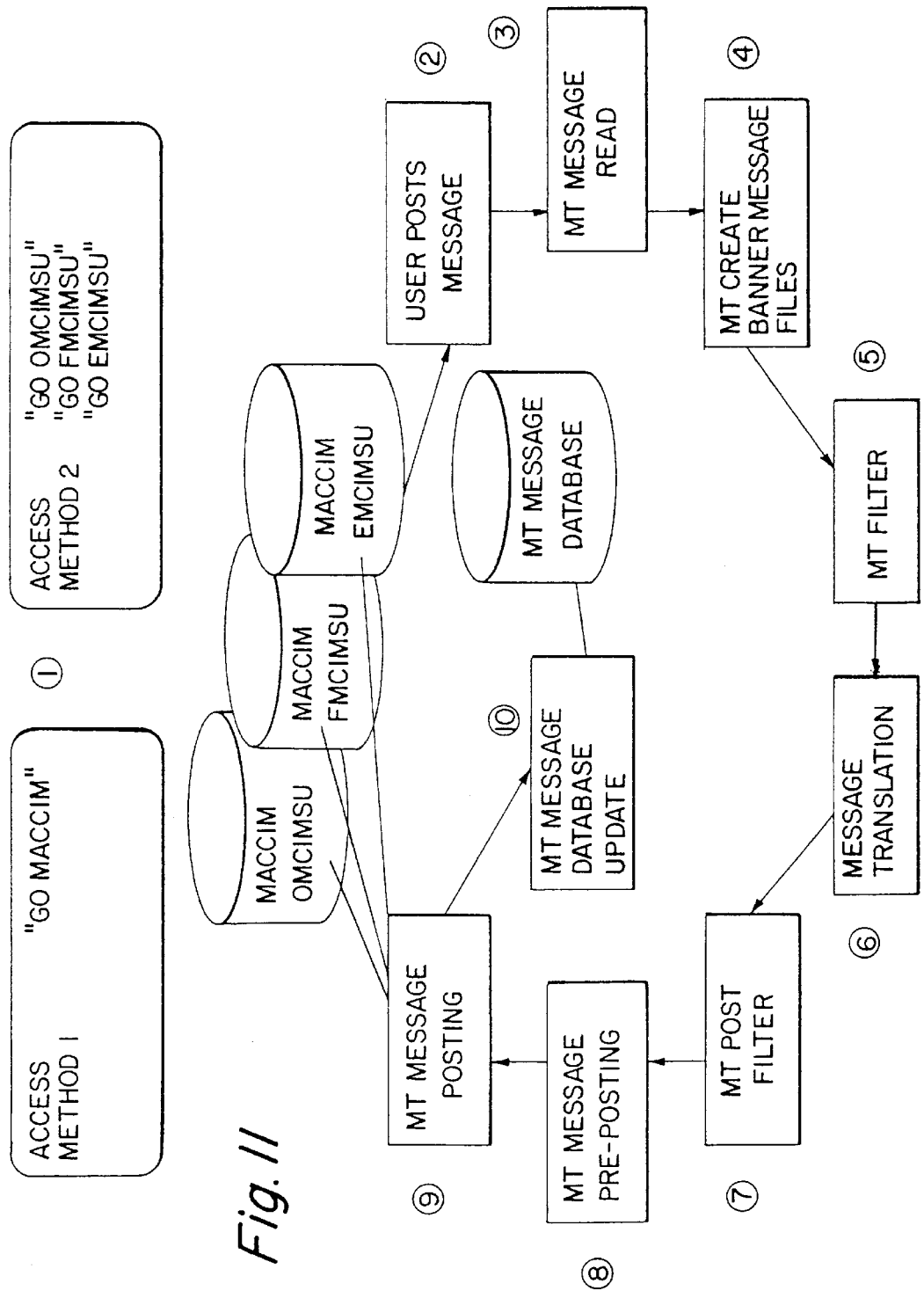
FIG. 11 is a diagrammatic view of the process of the present invention.
Figure 12:
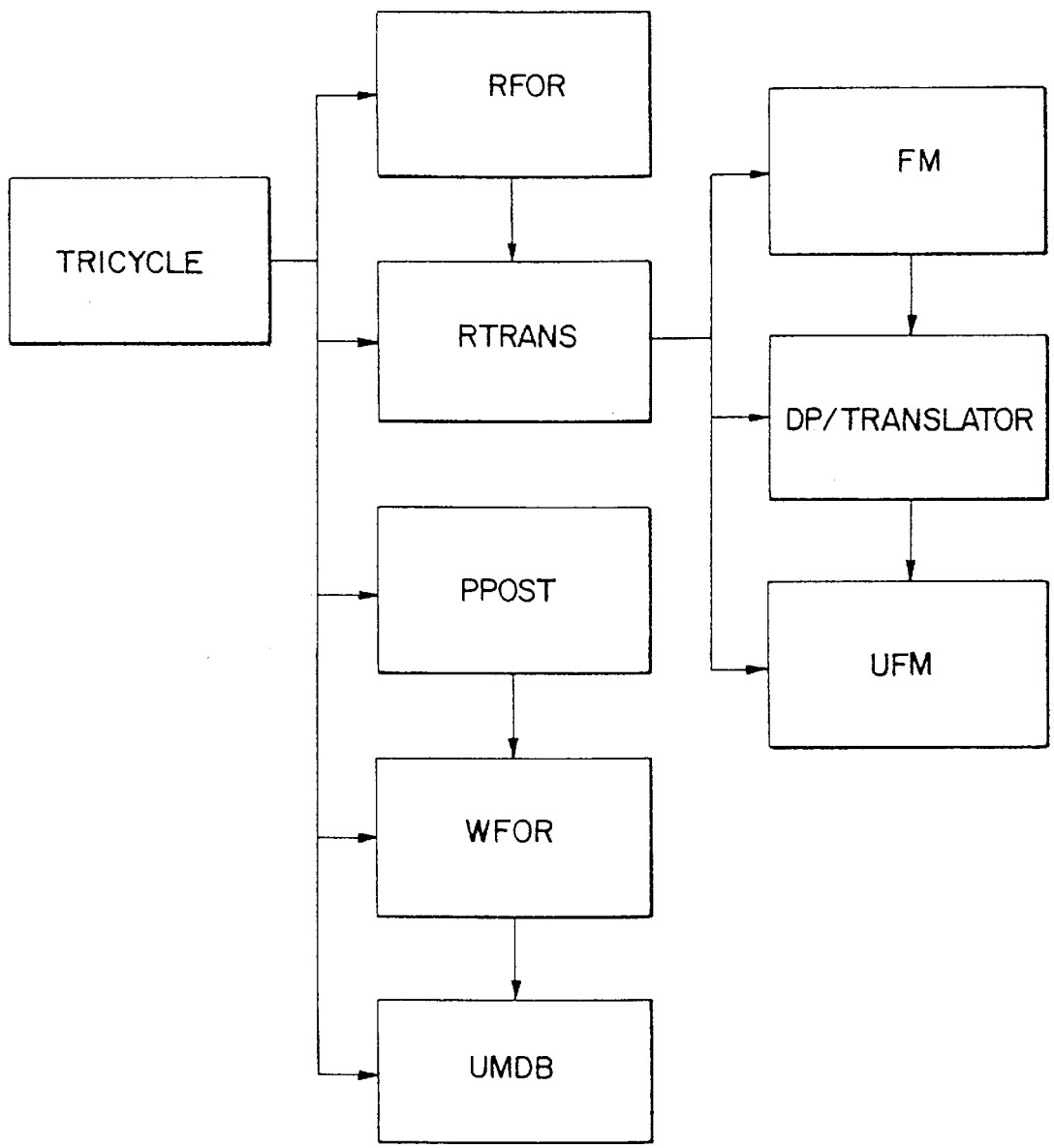
FIG. 12 is a flow chart of the machine translation software process flow of the present invention.
Figure 13A:
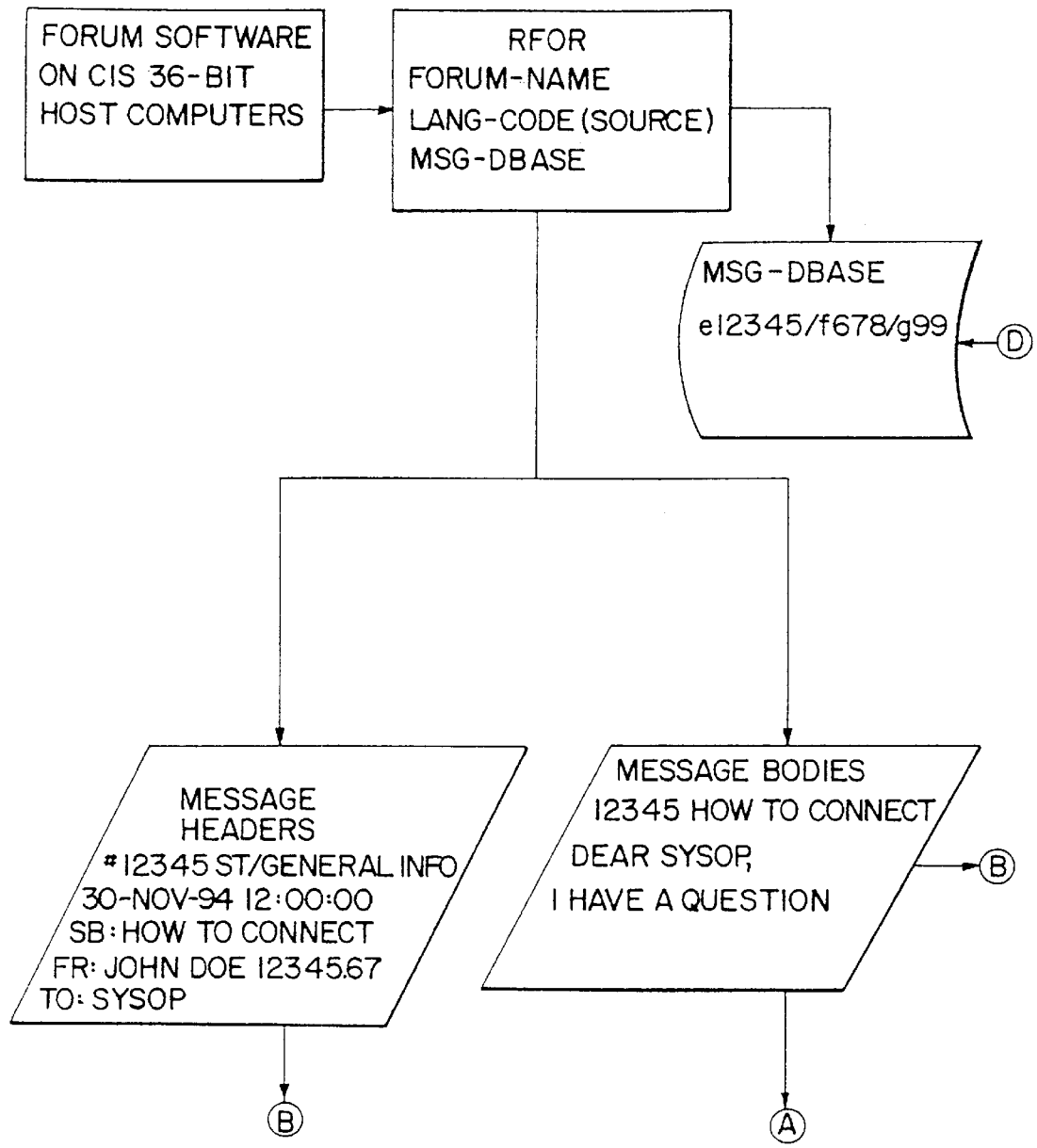
FIG. 13 A–13 D is a detailed flow diagram of the process shown in FIG. 12.
Figure 13B:
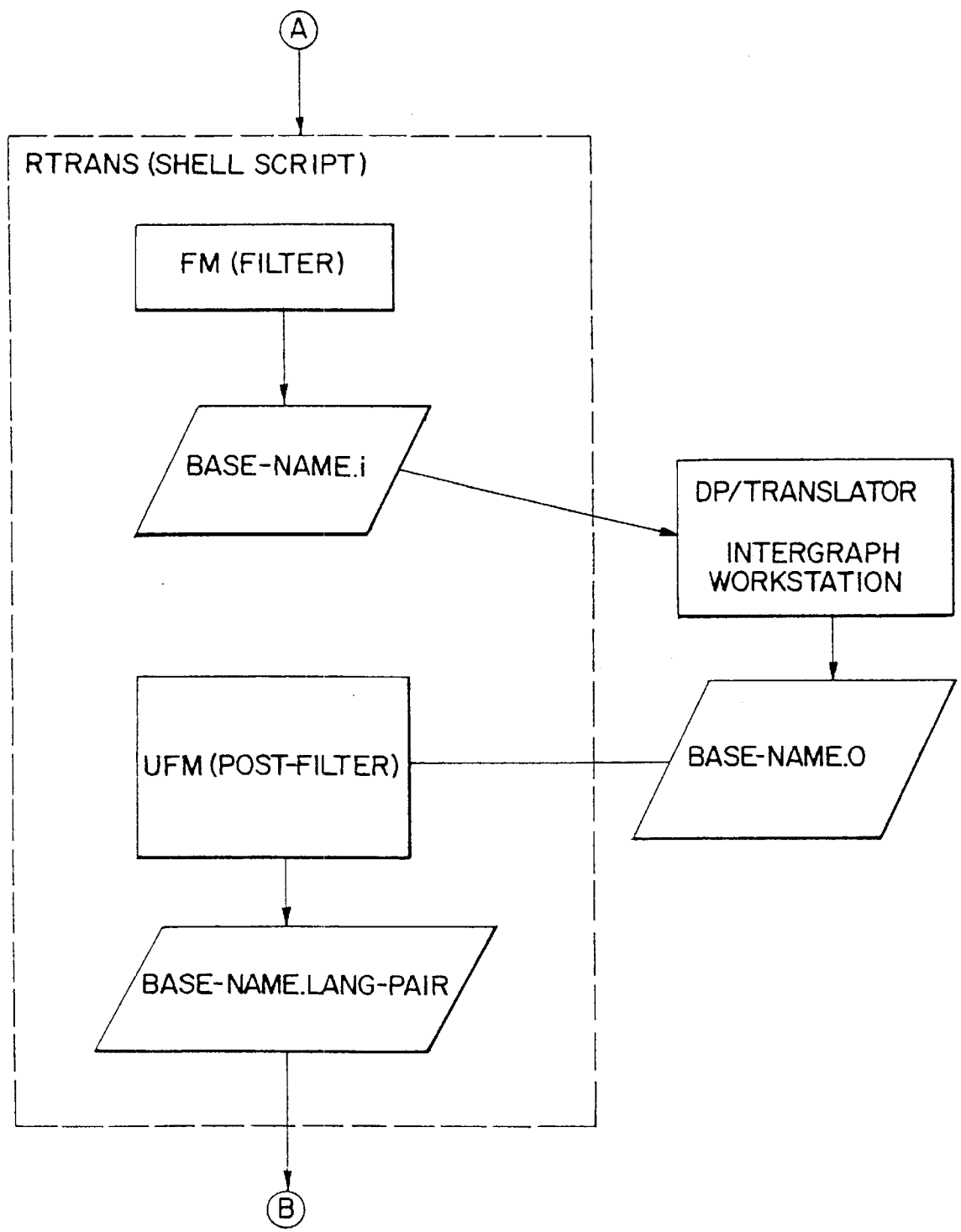
Figure 13C:
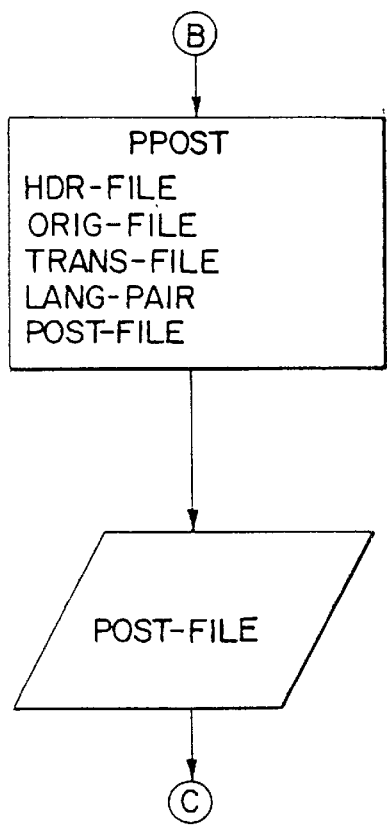
Figure 13D:
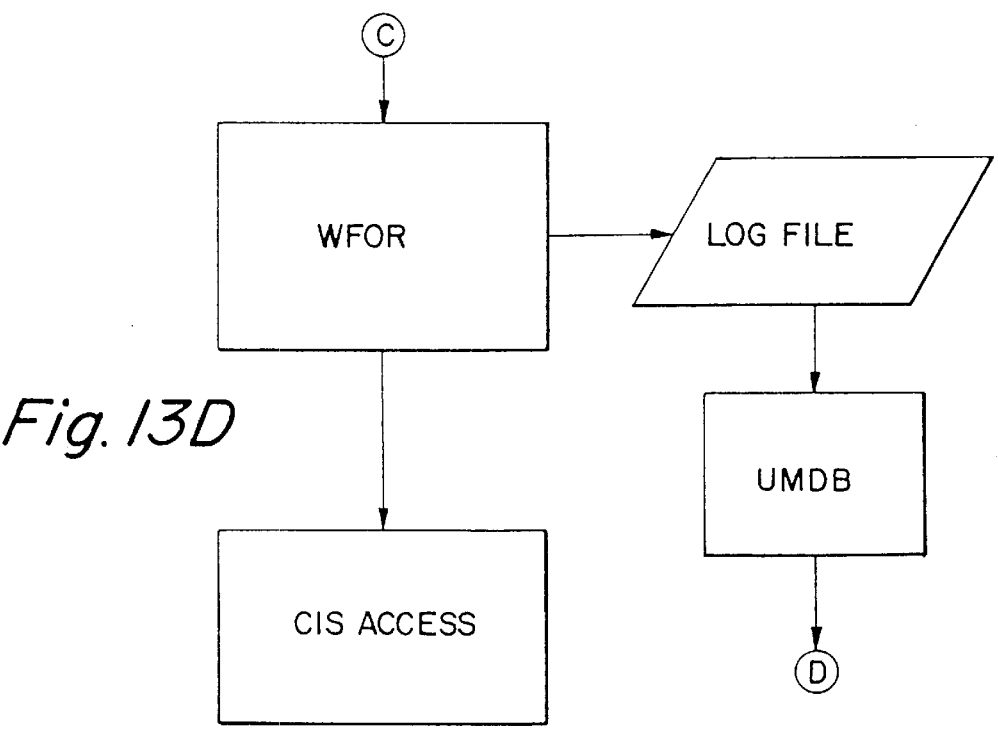

Referring to FIGS. 11 and 12 a user posted message can originate from any of the three parallel discussion groups. The MT Message Read Process reads the message from the discussion group. A body text file is created as input to a filtering process. The message passes through the translation process. English is translated to French and German. German or French is translated to English.

The message is filtered again to remove the markers added during the MT Filter process for text that was not intended for translation. During translation, the original message text was saved in the originating language to be included with the translation. The translated message is further prepared for posting to the other two discussion groups. A posting output file is created that contains translated text, text in the originating language, and additional information required for posting.

MT Message Number Database Update adds a line of three message numbers (in this Example) to a database to maintain a cross reference of message identifiers among the three discussion groups. These include the message number that the source discussion group assigns to the message and the corresponding message numbers for the other two destination discussion groups.

The following introduces the software components of the MT process. The diagram in FIG. 12 shows the flow in which these components run.

(4) Calls the program rfor for the English discussion group; rfor connects to CompuServe and reads new message headers to identify new messages to be translated;

(5) Calls the shell script rtrans for the English discussion group; rtrans runs the messages through a filter program fm that identifies untranslatable message text, sends the message to DP/Translator for translation, and routes the output from the translation to a post filtering program ufm;

(6) Calls the program ppost for the English discussion group; ppost creates the file to be posted to the discussion groups; this program is run twice, once to create the English-to-German translation file and another to create the English-to-French translation file;

(7) Performs steps 3 through 5 for the French and German discussion groups, although it only runs rtrans once because translation only occurs for French to English and German to English;

(8) Calls the program wfor six times, once for each language pair (ef, eg, fe, fg, ge, gf), to post all translated messages to their appropriate discussion groups; and, (9) Calls program umdb six times, once for each language pair (ef, eg, fe, fg, ge, gf), to update message number database.

The program rfor reads messages from the discussion group, checks to make sure they are not machine translated, and prepares them for filtering. The shell script tricycle calls rfor and provides it with the necessary parameters.

The program rfor does the following:
(1) Connects to CompuServe;
(2) Reads new message headers from the discussion group;
(3) Compares the message numbers in the headers against those listed in a message number database to determine

| Name | Type | Description |
| --- | --- | --- |
| tricycle | Unix shell script | Orchestrates the hourly cycle of the MT process by calling each program in their appropriate order |
| rfor | C program | Reads messages from MacCIM discussion groups, determines whether they need to be translated, and creates a message header file and a message body text file; called by tricycle |
| rtrans | Unix shell script | Calls fm to filter the message file, DP/Translator to translate the messages, and ufm to perform post-translation filtering; called by tricycle |
| fm | C program | Identifies text that is not to be translated and surrounds with markers; called by rtrans |
| DP/Translator | Intergraph product | Performs message translation; called by rtrans |
| ufm | C program | Removes markers that surround text identified by fm as non-translatable; called by rtrans |
| ppost | C program | Creates a new file containing translated message to post to discussion groups; called by tricycle |
| wfor | C program | Posts messages to their corresponding discussion groups; called by tricycle |
| umdh | C program | Updates a message number database; called by tricycle |

The shell script tricycle governs sequencing of the MT process shown in greater detail in FIGS. 13A–13D. Preferably, each hour, it runs the MT programs in the appropriate order and for the correct number of times. The tricycle script does the following:

(1) Sets some shell variables based on the current date and time; these are used to construct unique names for the temporary files that will be created;
(2) Enters a request in the at queue to cause tricycle to be run again at half-past the next hour;
(3) Backs up a message number database;

whether the message is a machine-translated message from another discussion group; if so, it skips the message and goes to the next one;

(4) Creates a message header file that contains the message number, a date and time stamp, subject, sender, and recipient information; and (5) Creates a message body text file that contains the message number, subject, and message text.

The following parameters are specified:

| | |
|---|---|
| discussion group-name | name of discussion group from which message originated (emcimsu, fmcimsu, dmcimsu) |
| lang-code | one-letter code (e, f, or g) specifying the source language specified in the CompuServe user profile |
| msg-dbase | name of the Unix database that holds a cross reference of all message numbers for each discussion group |
| hdr-file | name of the header file created as output |
| msg-file | name of the message file created as output |

Inputs to rfor are discussion group-name, lang-code, and msg-dbase provided by tricycle. Outputs from rfor include hdr-file that is input to the MT Pre-Posting Process, and msg-file that is the input to the MT Filter Process.

The shell script rtrans calls the programs that filter, translate, and refilter the messages to be translated. The shell script tricycle calls rtrans.

The program rtrans does the following:

(1) Takes as input from tricycle the base name (referred to as base-name in some of the program descriptions that follow), the source language code, and the target language code;

(2) If the source language code is g for German, then calls the filter program fm with a special -g parameter that handles capitalization grammar rules specific to the German language;

(3) If the source language code is f or e, calls filter program fm without special capitalization rules;

(4) Calls DP/Translator, providing it with the output file from fm and additional parameters; and, (5) Retrieves the output and passes it through the post filter program ufm.

The program fm runs the message file created during the MT Message Read Process through a filtering process to prepare the message text for translation. The shell script rtrans runs the program and provides it with the necessary parameters. Then it submits the filtered output file as input to the translation program DP/Translator.

The program fm does the following:

(1) Evaluates text for strings that should not be translated;

(2) Places marks around the identified strings; and, (3) If the source language is German, performs special filtering to handle nouns that are always capitalized.

When it runs fm, rtrans redirects input from the file base-name source-lang. When it runs fm, rtrans directs output to a target file name called base-name.i.

The program ufm runs the file generated from the language translation process DP/Translator through a process that removes markers surrounding text strings that were not translated. The shell script rtrans runs the program and provides it with the necessary parameters.

When it runs ufm, rtrans redirects input from the file base name.o, which is an output file generated by DP/Translator during the translation process. When it runs ufm, rtrans directs output to a target file base-name.target-lang, where target-lang is the one-character language code (e, f, g) of the language to which the message was translated.

The program ppost creates a new file to post to the discussion groups. The shell script tricycle calls the program six times, once for each source-target language translation pair (ef eg, fe, fg, ge, gf). The header and message files may contain more than one message per run of ppost.

The program ppost does the following:

(1) Retrieves the header file created during the MT Message Read process;

(2) Retrieves the original message text written in the source language;

(3) Retrieves the translated message text;

(4) Determines the translation direction; and, (5) Creates an output file that contains the entire translation message.

The following parameters are specified:

| | |
|---|---|
| hdr-file | header file created during the MT Message Read Process |
| orig-file | message in its original form, created during the MT Message Read Process |
| trans-file | translated message file |
| lang-pair | two-character code identifying the source-target language translation pair |
| post-file | file containing entire message to be posted onto the target discussion group |

Inputs to ppost include the header file from the MT Message Read Process (base-name.hdr), the original text file from the MT Message Read Process and, the source-target language pair. The posting files that ppost creates contain: the original message number; the parent message number if this is a reply; sender, recipient and (translated) subject information; a banner that identifies the message to follow as translated text and displays the original subject; the translated text; a banner that identifies the message to follow as the original text; and, the original text.

The program wfor accesses CompuServe and posts translated messages to their corresponding CompuServe Forum® discussion groups. The shell script tricycle calls the program six times, once for each source-target language translation pair (ef, eg, fe, fg, ge, gf).

The program wfor does the following:

(1) Accesses the appropriate CompuServe discussion group;

(2) Posts the message files created during the MT Pre-Posting Process; and, (3) Appends message and message number information to a log file that is later used to update the message number database.

The following parameters are specified:

| | |
|---|---|
| discussion group-name | name of destination discussion group |
| post-file | name of the file created during the MT Pre-Posting Process |
| lang-pair | two-character code identifying the source-target language translation pair |
| msg-dbase | name of the Unix database that holds a cross reference of all message numbers for each discussion group |
| log-file | file to which message numbers are appended and from which the cross reference of message numbers are updated |

Inputs to wfor include discussion group-name, post-file, lang-pair, and msg-dbase provided by tricycle. The outputs of wfor include the updated discussion groups and six message database log files, one for each language pair.

The program umdb updates the message number database with the message IDs assigned to each message on a discussion croup. The shell script tricycle calls umdb six times, once for each source-target language translation pair (ef, eg,fe, fg, ge, gf).

Umdb does the following:

(1) Opens the message database; and, (2) Loads the message data into the database.

The following parameters are specified:

| | |
|---|---|
| log-file | file to which message numbers are appended and from which the message number database is updated. |
| lang-pair | two-character code identifying the source-target language translation pair. |
| msg-dbase | name of the Unix database that holds a cross reference of all message numbers for each discussion group. |

Inputs to umbd include log-file, lang-pair, and msg-dbase provided by tricycle. The output of umdb is the updated database.

END OF EXAMPLE

The present invention integrates MT software into an online environment such that translation of messages occurs automatically at a remote site. Messages are translated automatically at a remote site the unique aspects of the invention-periodic and automatic translation of BBS or forum messages at a remote site that facilitates timely communications among on-line subscribers. Using Applicant's invention, translation is accomplished automatically via a batch process so computer users are not required to decide which messages should be translated or how they should be translated. Users need only specify a language preference to take advantage of the present invention. Furthermore, users are not required to install and maintain the MT software on their computers as translation occurs automatically at a remote site through a batch process. Communication among on-line subscribers who use different languages is facilitated in an automated fashion so subscribers may concentrate on message content rather than the method by which their messages will be communicated to one another.

What is claimed is:

1. A system for electronic communication between users of different languages, comprising:
   a first electronic discussion group structure adapted to display messages in a first language;
   a second discussion group structure adapted to display messages in a second language;
   means for posting a message on said first discussion group structure, said message in said first language;
   means for submitting said message to a first batch process adapted to translate said message into said second language;
   means for posting said message into said second discussion group in said second language;
   means for posting a reply to said message on to said second discussion group structure, said reply in said second language;
   means for submitting said reply to a second batch process adapted to translate said reply to said first language; and
   means for posting said reply in said first language onto said first discussion group structure.

2. A system in accordance with claim 1, wherein said means for translating said message includes a data filter which preprocesses said message in said first language and post-processes said message in said second language.

3. A system in accordance with claim 1, wherein said discussion group languages are comprised of an English version, a French version, and a German version.

4. A system in accordance with claim 3, wherein said means for translating is adapted to translate English to French, French to English, English to German, and German to English.

5. The system of claim 1 wherein said first and second discussion groups are accessible by setting a language preference.

6. A method for electronic communication between users of different languages over a network electronic bulletin board system comprising the steps of:
   (a) developing a plurality of parallel discussion groups for the storage and display of electronic information;
   (b) receiving an input message from a user at one of said discussion groups;
   (c) submitting the input message to a batch process adapted to translate the input message from its original language text to a target language text;
   (e) collecting the translated input message from the batch process and posting said translated input message to a second discussion group adapted to display said target language.

7. A method in accordance with claim 5, further comprising the step of preprocessing the inputted text for the purpose of identifying and marking words which are best left untranslated.

8. A method in accordance with claim 7, further comprising the step of: post-processing the inputted text for the purpose of rearrangement of the untranslated word into the target language.

9. A method of providing translated messages in a plurality of electronic discussion structures running on at least one computer network, the method comprising the steps of:
   posting a first message from a first user onto a first electronic discussion structure, said first message appearing in a first language;
   providing a machine translator in electronic communication with said network, said machine translator capable of receiving and batch processing a plurality of messages;
   translating said first message, with said machine translator, into a second language;
   posting said first message onto a second electronic discussion structure, said second message appearing in said second language;
   posting a response to said first message onto said second electronic discussion structure, said response appearing in said second language;
   translating said response into said first language;
   posting said response in said first language onto said first electronic discussion structure;
   posting a third message onto a third electronic discussion structure, said third message appearing in a third language;
   translating said third message into said first language;
   posting said third message in said first language onto said first electronic discussion structure;
   translating said third message into said second language; and
   posting said third message in said second language onto said second electronic discussion structure.

10. The method of claim 8 further comprising the step of setting a language preference to access said first, second, or third discussion structure.

11. A method for electronic communication between users of different languages over a network electronic bulletin board system comprising the steps of:
   selecting a first one of a plurality of languages;
   transmitting a message in a second one of said plurality of languages to said electronic bulletin board system;

translating said message at said electronic bulletin board system from said second one of said plurality of languages to said first one of said plurality of languages, said translation performed by a machine translator capable of receiving and batch processing, a plurality of messages; and displaying said translated message to a user selecting said first one of said plurality of languages.

12. The method of claim 11 further comprising the steps of:

selecting a third one of said plurality of languages;

translating said message at said electronic bulletin board system from said second one of said plurality of languages to said third one of said plurality of languages, said translation performed by said machine translator capable of receiving and batch processing a plurality of messages; and displaying said translated message to a user selecting said third one of said plurality of languages.

\* \* \* \* \*